Inventor
ANTHONY J. GOSSELIN,
By Clarence A. O'Brien
and Harvey B. Jacobson
Attorneys Feb. 17, 1948.　　　　A. J. GOSSELIN　　　　2,436,003
AXIALLY OPERATING-TYPE TIRE AND RIM SEPARATING MACHINE
Filed Nov. 9, 1944　　　　4 Sheets-Sheet 4
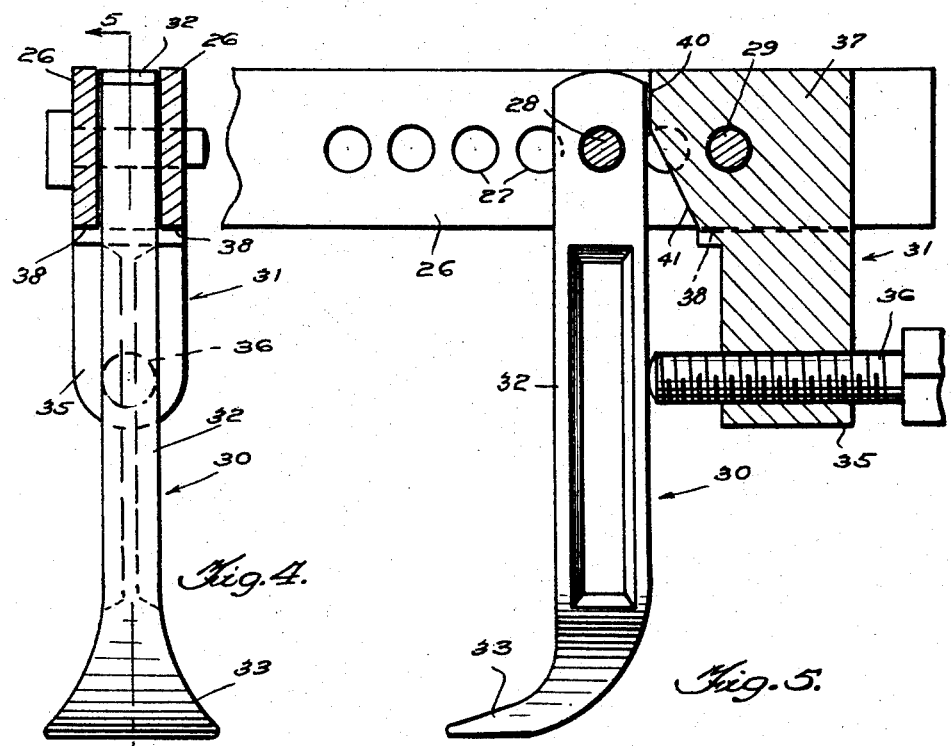
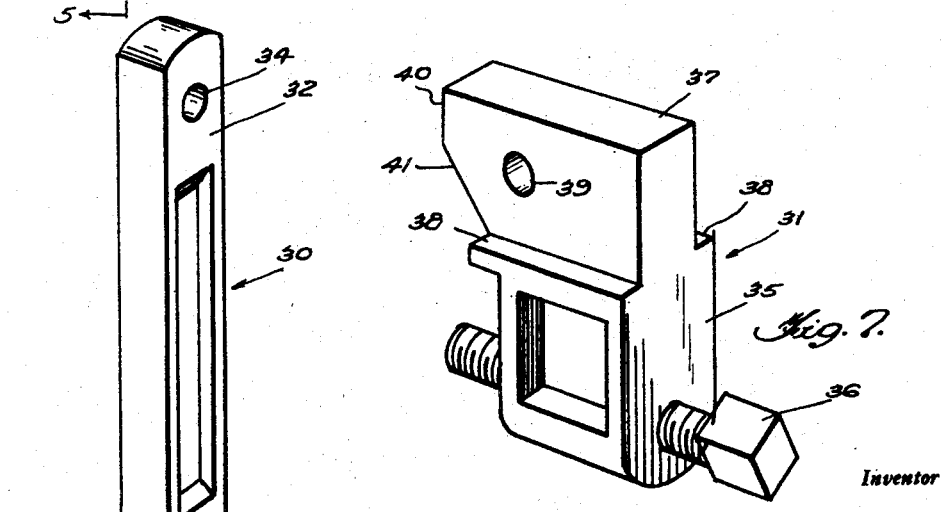
Inventor
ANTHONY J. GOSSELIN,
By
Attorneys Patented Feb. 17, 1948

2,436,003

UNITED STATES PATENT OFFICE 2,436,003

AXIALLY OPERATING-TYPE TIRE AND RIM SEPARATING MACHINE

Anthony J. Gosselin, Eureka, Calif.

Application November 9, 1944, Serial No. 562,669

4 Claims. (Cl. 157—6)

This invention relates to a novel and improved machine which is believed to constitute a practicable and feasible contribution to the art and trade, the same being such as to dislodge and dismount a tire from a rim, or conversely, to push the rim out of the tire.

More particularly, the invention appertains to a heavy duty machine which is expressly devised and balanced to remove truck tires which have become frozen or stuck to their rims. In this connection, it is a matter of common knowledge that, employing hand and other methods, it often takes one to three hours to remove truck tires that are frozen or stuck to rims, whereas with the machine to be hereinafter disclosed the time required is but a few minutes.

In carrying out the principles of the invention, I have evolved and produced a serviceable and expedient machine of a "floating type" in that the machine is self-contained and does not depend on any outside forces and devices to remove the tire or rim.

As above implied, I am sufficiently conversant with the field of invention with which we are here concerned to appreciate that there are other types of tire removers on the market. For instance, there is one, a tire remover, which mechanically shoves the tire down off the rim while the rim is held. There is another, a hydraulic structure in which the rim and tire is placed on a hydraulic ram, whereupon large hooks which are fastened to the floor are then placed around the tier adjacent the beads and rim. Then, when pressure is applied to the ram, it shoves the rim up while the hooks serve to hold the tire down. This is what has become to be known as a rim remover.

Briefly, and in reducing to practice the preferred embodiments and principles of the instant invention, I employ a suitable base, a rim block atop the base, a perpendicular yoke for saddling over a hydraulic jack, means to connect the yoke adjustably to the rim block, and a novel spider assembly, constituting thrust means, this associated with the yoke, and being pressed down under the forceful action of the associated jack.

More specifically, novelty is predicated upon the so-called spider assembly, this comprising an appropriate hub structure and radial arms, said arms being provided with adjustable presser feet, all parts being carefully designed and effectively coordinated to provide for equalized stress and strain distribution and a carefully centered press action.

Other features and advantages will become more readily apparent from the following description and accompanying illustrative drawings.

In the drawings, wherein like numerals are employed to designate like parts throughout the same:

Figure 4 is an enlarged fragmentary, sectional and elevational view showing one of the twin-type spider arms, this view looking in a direction from left to right in reference to Figure 5.

Figure 5 is a sectional view on the plane of the line 5—5 of Figure 4, also looking in the direction of the arrows.

Figures 6 and 7 are detailed perspective views showing first the presser foot; and secondly, the complemental adjusting and stabilizing device therefor.

Figure 1:
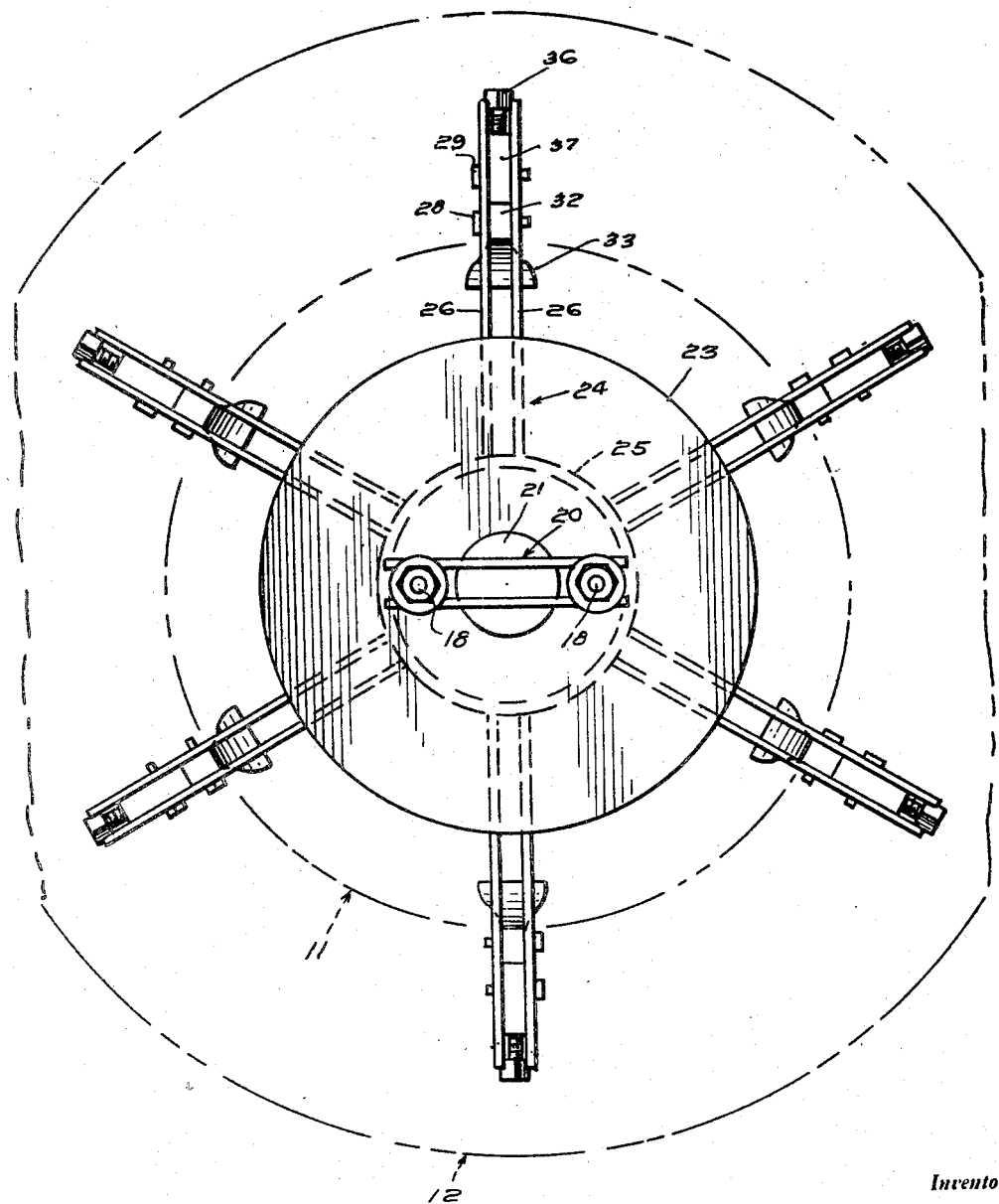
Figure 1 is a top plan view of a tire and rim handling machine constructed in accordance with the specific principles of the instant invention, many of the features appearing in dotted lines.
Figure 2:
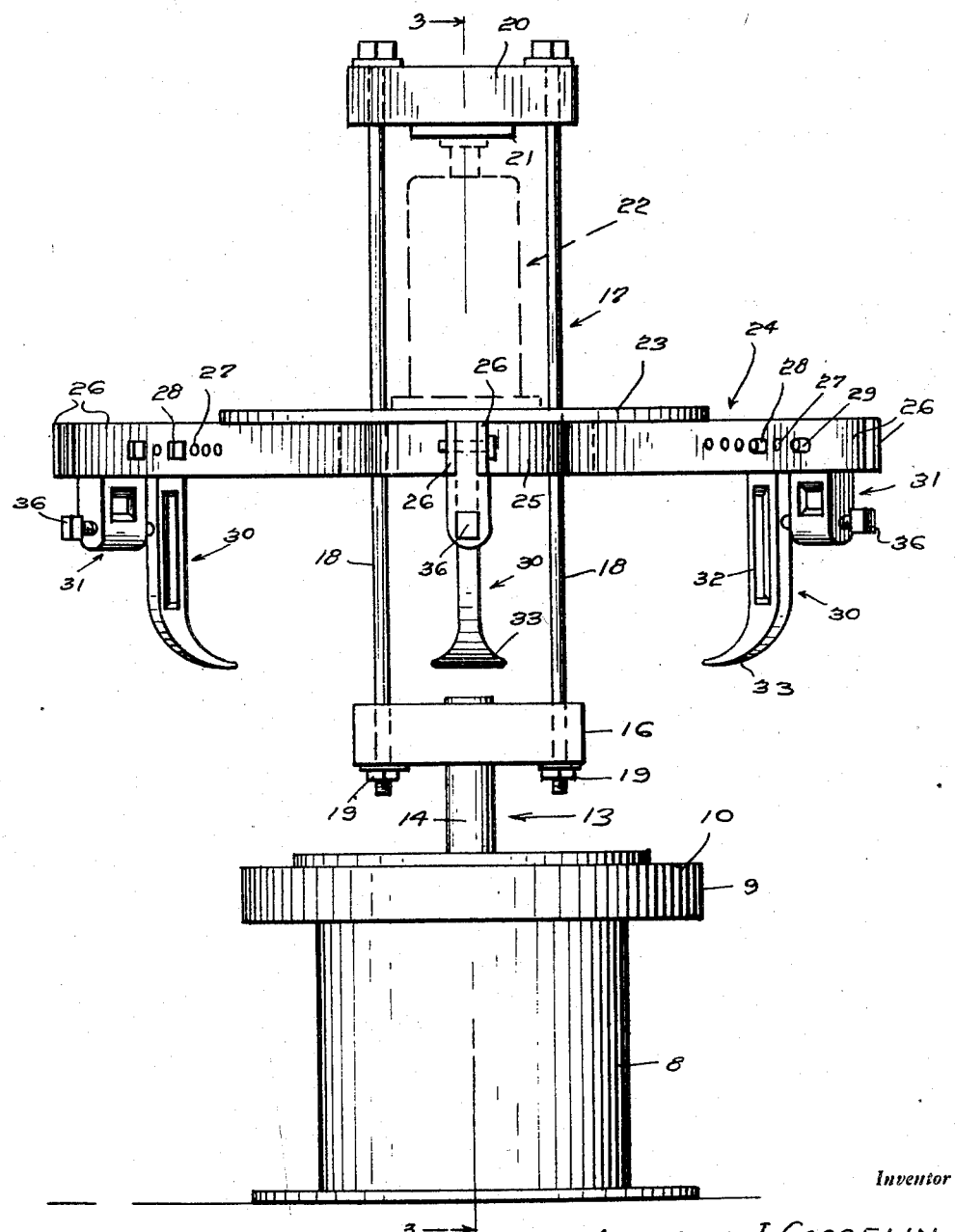
Figure 2 is an elevational view disclosing the complete machine.
Figure 3:
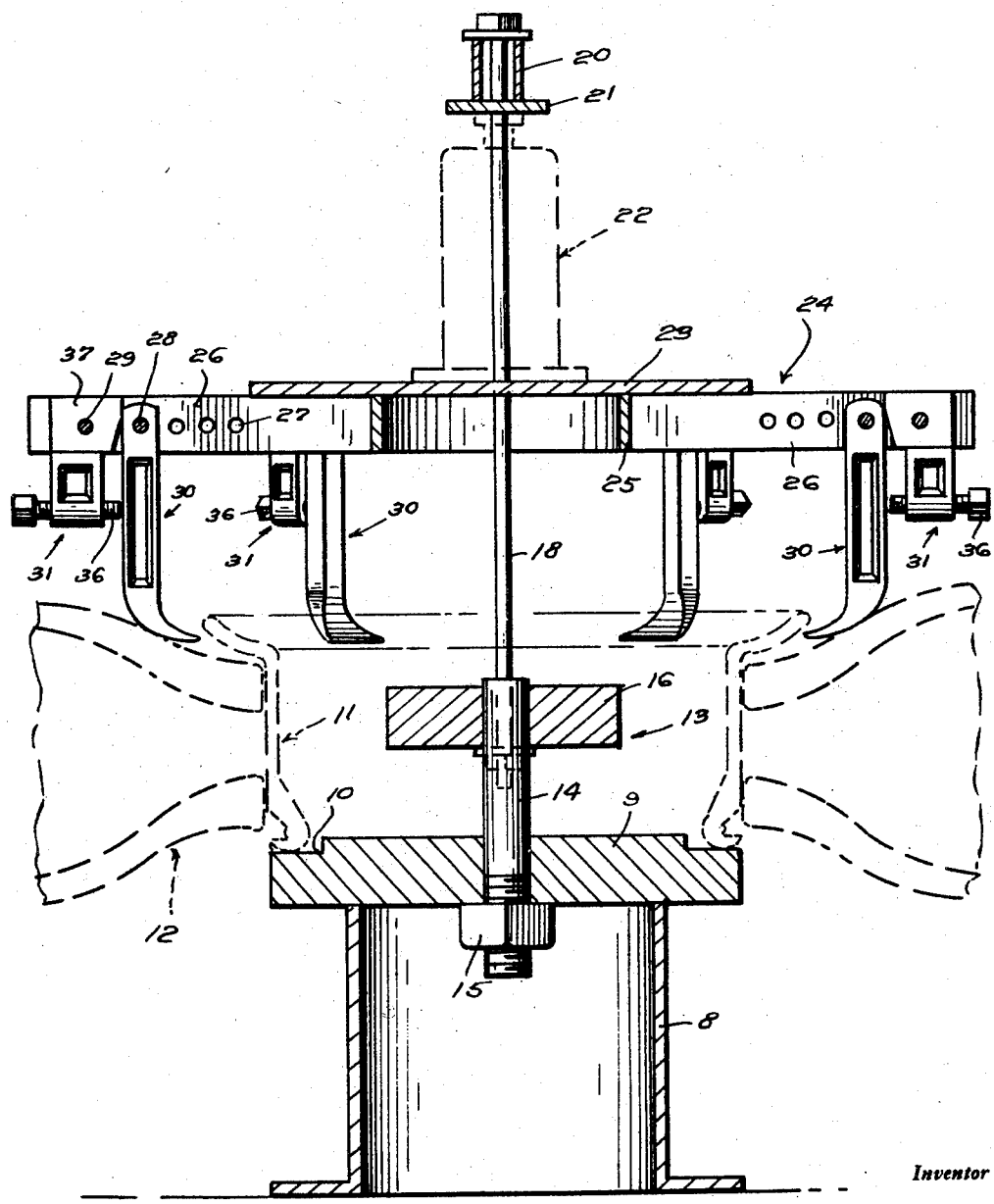
Figure 3 is a central vertical sectional view, this taken on the vertical line 3—3 of Figure 2, looking in the direction of the arrows.

Referring now to Figures 2 and 3, it will be seen that the numeral 8 designates a cylindrical base having a circular rim block 9 rigidly secured to the top thereof. The block has a shouldered marginal portion constituting a ledge 10, which extends radially outwardly beyond the base 8. The ledge serves to seat the conventional truck rim 11 (see Figure 3), and the block as a unit is of a diameter less than the tire 12, whereby it permits the latter to slip down over said block after it has been dislodged and removed from the rim.

The numeral 13 designates a T-shaped adapter which, as seen in Figure 3, comprises a central bolt 14 passing down through a hole in the center of the rim block and adjustably drawn down and anchored by a clamping nut 15 beneath the block. The T-head 16 is spaced above the block and serves to accommodate a perpendicular yoke 17. This yoke comprises rods or long bolts 18, appropriate gauge and lengths, these being adjustably anchored at their lower ends as at 19, in the end portions of the T-head 16. The crosshead at the upper headed ends of said rods 18 is fashioned from parallel plates 20 secured to a disc 21 which serves as an end thrust for a part of the conventional hydraulic jack 22 which, in use, is saddled in the yoke. The lower part of the jack sits on a disc-like plate 23 welded to the central top portion of the spider assembly 24.

The spider assembly comprises a central hub ring 25 having equidistant circumference of spaced arms welded to and radiating therefrom. The plate 23 is welded to the ring as well as the inner end portions of the arms. The arms are actually made up of complemental, parallel spaced bars 26 of appropriate lengths. The bars are provided with oppositely disposed and aligned pin holes 27, these to accommodate pins 28 and 29 for mounting and adjustment of the companion units 30 and 31, respectively. I provide the units 30 and 31 for each of the two-part or twin spider arms. The unit 30 (see Fig. 6) is in effect a thrust element which we shall call a presser foot, the same comprising a shank 32 rectangular in cross section terminating in its lower end in a laterally deflected wedge-shaped tire adapter head 33. The upper end of the shank is apertured to provide bolt hole 34 which is located between the spaced arms and held in place by the aforementioned attaching and adjusting pin 28. This form of presser foot adapts itself admirably well to wedge in between the flange of the rim and side wall of the tire casing shown, for example, in Figure 3.

The companion or complemental unit 31 (see Fig. 7) comprises a depending block 35 carrying a set screw 36, said block having a reduced extension 37 at its top forming a slide. The portion forming the juncture between the slide and block is such as to also define outstanding shoulders 38 which rest in contact with and slide against under edges of the arms 26. The slide is also provided with a bolt hole 39 to accommodate the pin or bolt 29. One end of the slide projects beyond the block where it forms an abutment 40 engaging the adjacent straight edge of the shank on the presser foot, this for balance and stability, and serves as a centering device for the spider assembly. There is a receding portion 41 to allow for slight tilt of the presser foot, if necessary or desired. This could be called a clearance surface.

In practice, the tire rim 11 is placed, as shown in dotted lines in Figure 3, on the accommodation ledge 10. Then the spider assembly is seated approximately in place with the presser feet of units 30 resting on the upper side wall of the tire casing 12. The rods or bolts 18 are anchored, as at 19, on the T-adapter 13, this adjustably secured to the rim block 9. It will be noticed that the rods 18 pass down through apertures diametrically arranged in the jack seating plate 23 and on the inner peripheral portion of the hub ring 25. The hydraulic jack is interposed between the plate 23 and the end thrust disc 21 on the crosshead 20. The various presser units 30 are adjustable in and between their respective suspension arms 26. Presser units 30 and their toe or head portions 33 are both well up adjacent the flange of the rim to pry in between the wall of the tire and rim. The adjustments are made and retained by the associated or complemental adjusting and stabilizing units 31. Then the jack is operated to drive the entire spider assembly down, whereby to first dislodge the tire and to thereafter permit it to be completely freed to slip down around the base 8. The entire superstructure comprising the yoke 17 and spider assembly can be removed to permit removal of the tire. Experience will, of course, be the best teacher in actually assembling and operating and otherwise using the machine.

The machine can also be used to "push" tires onto the rims when the same are extra tight to put on by hand. This is accomplished by placing the rim or wheel on the base, right side up, then placing the tire and machine in position and applying the power. This procedure will shove the tire onto the rim. In order to accommodate different diameter plain rims on base, spacer rings are used on said base.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A spider assembly for use and association with a machine of the class described comprising a hub structure to accommodate a jack or the like, and a plurality of equidistant circumferentially spaced arms, each arm being composed of parallel bars, said bars being provided with longitudinally spaced pin-holes, a presser foot having a shank mounted between the bars and pivotally and adjustably held in place, a slide mounted between the bars and outwardly of the shank, said slide having a depending block, said block having a set screw, and said set screw being engageable with the intermediate portion of the adjacent shank.

2. In a structure of the class described, a spider assembly including a centralized hub structure and a plurality of radiating arms, the arms being arranged in spaced pairs and in substantial parallelism to each other, said arms being provided with aligned pin holes, and thrust and pressure units carried by each pair of arms, each unit embodying a presser foot having a shank secured by a hinge pin in predetermined pin holes, a block depending below the adjacent end and edge portions of said arms, said block coacting with the shank of said presser foot and being provided with a set-screw engageable with said shank, said block being further provided with a reduced slide, said slide being arranged adjustably between the arms and the upper end of the block forming shoulders, and said shoulders being in slidable contact with the adjacent lower edges of the arms, said slide having its inner vertical end forming an abutment and a portion of said abutment being bevelled and inclining outwardly to allow for tiltable adjustment of the adjacent portion of said shank, said abutment engaging said adjacent portion of said shank.

3. A spider assembly of the class described comprising a centrally positioned hub-ring, said hub-ring being provided with outstanding circumferentially spaced pairs of parallel bars, a hub-plate superimposed upon the upper edge of said hub-ring and secured thereto, the outer marginal edge of said hub plate overlying and coacting with the inner end portions of the respective bars, said bars being disposed in parallel pairs, a presser foot having a shank shiftably and hingedly mounted between the outer end portions of the bars of one pair, a block arranged beneath the bars of the same pair and having its upper end slidable in contact with the lower edges of said bars, said block having a set screw engaging said shank, said bars also having a slide and said slide being mounted adjustably between the bars of the same pair, the inner end of the slide constituting an abutment, and said abutment coacting with the adjacent hinged end portion of the shank of said presser foot.

4. In a tire and rim handling and separating machine of an axially shiftable type, a vertically disposed hollow cylindrical open ended base having an integral outstanding basing and supporting flange at its bottom, and a solid circular type tire rim supporting block rigidly mounted atop said base and serving to close the upper end of said base, said rim block being of a diameter greater than said base and the outer perimeter edge portion thereof projecting radially and outwardly beyond exterior surfaces of the base and having its upper surface rabbeted and shouldered to provide a marginal annular rim supporting ledge, said rim block being centrally apertured, and a T-shaped adaptor unit comprising a bolt adjustably mounted in the aperture in said rim block, said bolt being provided on its lower threaded end with a nut and said nut being accessible through the open bottom of said base, and said T-shaped unit also including a horizontal adaptor head disposed in spaced parallelism above the upper surface of said rim block, said head being provided at its ends with bolt holes adapted to accommodate bolt means embodied in a pressure and thrust producing yoke associable with said T-shaped unit.

ANTHONY J. GOSSELIN.

REFERENCES CITED

The following references are of record in the file of this patent:

UNITED STATES PATENTS

| Number | Name | Date |
|---|---|---|
| 1,615,469 | McKenzie | Jan. 25, 1927 |
| 1,724,813 | Weaver et al. | Aug. 13, 1929 |
| 2,219,238 | St. John | Oct. 22, 1940 |
| 267,152 | Cloud | Nov. 7, 1882 |
| 1,415,865 | Brown | May 16, 1922 |
| 2,406,996 | Colley | Sept. 3, 1946 |
| 1,890,746 | O'Dell | Dec. 13, 1932 |
| 1,742,590 | Freivogel | Jan. 7, 1930 |

FOREIGN PATENTS

| Number | Country | Date |
|---|---|---|
| 492,552 | Germany | Feb. 25, 1930 |
| 612,890 | Germany | May 7, 1935 |
| 659,107 | Germany | Apr. 25, 1938 |